United States Patent
Sasaki et al.

(10) Patent No.: US 10,054,119 B2
(45) Date of Patent: Aug. 21, 2018

(54) OPERATING MACHINE

(75) Inventors: Masataka Sasaki, Hitachi (JP);
Hidetoshi Satake, Ishioka (JP); Takako Satake, legal representative, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 1164 days.

(21) Appl. No.: 13/982,551

(22) PCT Filed: Jan. 31, 2012

(86) PCT No.: PCT/JP2012/052096
§ 371 (c)(1),
(2), (4) Date: Dec. 3, 2013

(87) PCT Pub. No.: WO2012/105537
PCT Pub. Date: Aug. 9, 2012

(65) Prior Publication Data
US 2014/0186191 A1  Jul. 3, 2014

(30) Foreign Application Priority Data
Feb. 1, 2011  (JP) .................................. 2011-019924

(51) Int. Cl.
*F04B 49/06* (2006.01)
*F04B 49/10* (2006.01)
(Continued)

(52) U.S. Cl.
CPC ........ *F04B 49/065* (2013.01); *B60L 11/1861* (2013.01); *F04B 1/26* (2013.01);
(Continued)

(58) Field of Classification Search
CPC .... F04B 1/26; F04B 31/28; F04B 1/29; F04B 1/295; F04B 1/30; F04B 1/32;
(Continued)

(56) References Cited

U.S. PATENT DOCUMENTS 5,177,965 A * 1/1993 Nikolaus ............... F04B 49/065
60/445
7,086,226 B2 * 8/2006 Oguri .................... E02F 9/2075
60/414

(Continued)

FOREIGN PATENT DOCUMENTS

JP  2005-83242  3/2005
JP  3941951  4/2007
(Continued)

*Primary Examiner* — Bryan Lettman
(74) *Attorney, Agent, or Firm* — Baker Botts L.L.P.

(57) ABSTRACT

A hybrid or battery type working machine including a hydraulic pump, an electric motor, an electric storage device, and a control device which controls a pump absorption horsepower maximum value in accordance with an amount of electricity stored in the electric storage device. The control device reduces the pump absorption horsepower maximum value by dividing the pump absorption horsepower maximum value into a plurality of regions having different target flow rates, and reduces the pump absorption horsepower maximum value from an old pump absorption horsepower maximum value corresponding to the pump absorption horsepower maximum value which has not yet been reduced to a new pump absorption horsepower maximum value corresponding to the pump absorption horsepower maximum value which has been reduced, so that temporal differences among the regions can increase in a descending order of a target flow rate.

5 Claims, 6 Drawing Sheets

(51) Int. Cl.
*F04B 49/20* (2006.01)
*F04B 1/26* (2006.01)
*F04B 27/14* (2006.01)
*B60L 11/18* (2006.01)
*H02J 7/04* (2006.01)
*E02F 9/20* (2006.01)
*E02F 9/22* (2006.01)
*B60L 1/00* (2006.01)

(52) U.S. Cl.
CPC .............. *F04B 27/14* (2013.01); *F04B 49/10* (2013.01); *F04B 49/103* (2013.01); *F04B 49/20* (2013.01); *H02J 7/044* (2013.01); *B60L 1/003* (2013.01); *B60L 2200/40* (2013.01); *B60L 2240/80* (2013.01); *E02F 9/207* (2013.01); *E02F 9/2075* (2013.01); *E02F 9/2091* (2013.01); *E02F 9/2235* (2013.01); *F04B 2201/1203* (2013.01); *Y02T 10/7005* (2013.01); *Y02T 10/705* (2013.01); *Y02T 10/7044* (2013.01)

(58) Field of Classification Search
CPC .. F04B 1/324; F04B 1/34; F04B 27/14; F04B 27/16; F04B 27/18; F04B 27/20; F04B 27/22; F04B 27/24; F04B 49/06; F04B 49/065; F04B 2201/1203; F04B 49/10; F04B 17/03; F04B 35/04; B60L 11/1861; H02J 7/044
See application file for complete search history.

(56) References Cited

U.S. PATENT DOCUMENTS

| | | | |
|---|---|---|---|
| 2010/0065054 A1* | 3/2010 | Bowman | A61M 16/00 128/204.21 |
| 2011/0093150 A1* | 4/2011 | Yanagisawa | B60W 20/13 701/22 |

FOREIGN PATENT DOCUMENTS

| | | |
|---|---|---|
| JP | 2009-256988 | 11/2009 |
| JP | 2010-115100 | 5/2010 |
| WO | WO2009125833 | * 10/2009 |

* cited by examiner

OPERATING MACHINE

TECHNICAL FIELD

The present invention relates to a hybrid type or battery type working machine provided with an electric motor which is driven for power running by electric power supplied from an electric storage device so as to serve as a drive source for a hydraulic pump. Particularly, it relates to a method for effectively using electric power stored in the electric storage device.

BACKGROUND ART

A hybrid type working machine has a configuration in which a hydraulic pump is driven by an engine and an electric motor (a motor generator is generally used, and the "electric motor" mentioned in this specification includes the motor generator.) driven for power running by electric power stored in an electric storage device, and hydraulic actuators are driven by pressure oil ejected from the hydraulic pump so as to perform a required operation. Assume that when the hybrid type working machine is in operation, the amount of electricity stored in the electric storage device reaches such a lower limit value that the electric storage device cannot discharge electricity. In this case, it is necessary to suspend discharge from the electric storage device to thereby suspend the power running drive of the electric motor while changing a pump absorption horsepower maximum value to be not larger than the maximum rated torque of the engine.

However, when the mode is suddenly changed over to a mode in which the hydraulic pump is driven only by the engine in the stage where the amount of electricity stored in the electric storage device has reached the lower limit value, the engine cannot bear a load solely but may fall into engine stall. In addition, the pump absorption horsepower maximum value drops suddenly in the stage where the amount of electricity stored in the electric storage device has reached the lower limit value. Therefore, there is another problem that a feeling of strangeness on an operation may be given to an operator. Further, when the amount of electricity stored in the electric storage device reaches the lower limit value in the middle of a preset operation scheduled time of one day, the capability of the working machine deteriorates since then. Therefore, there arises another problem that a scheduled operation cannot be completed.

In order to solve such problems, there has been proposed a technique in which when the residual amount of electricity stored in the electric storage device decreases to be not larger than a first predetermined value set in advance, a pump absorption horsepower maximum value is reduced so as to limit a power-running torque value of an electric motor in accordance with the residual amount of electricity stored in an electric storage device at that time, and when the residual amount of electricity stored in the electric storage device decreases to be not larger than a second predetermined value set in advance, the power-running operation of the electric power is prohibited to further reduce the pump absorption horsepower maximum value down to such a value that the pump can be driven by the rated output of an engine (for example, see Patent Document 1). In this manner, while the hybrid type working machine is in operation, the pump absorption horsepower maximum value does not suddenly drop down to be not larger than the maximum rated torque of the engine, but the pump absorption horsepower maximum value is decreased stepwise in accordance with the residual amount of electricity stored in the electric storage device. Thus, engine stall can be avoided and a feeling of strangeness on an operation given to an operator can be relaxed.

CITATION LIST

Patent Literature

Patent Literature 1: Japanese Patent No. 3941951

SUMMARY OF INVENTION

Technical Problem

However, even according to the technique described in Patent Document 1, the pump absorption horsepower maximum value is suddenly reduced to a level corresponding to the residual amount of electricity stored in the electric storage device in the stage where the residual amount of electricity stored in the electric storage device decreases to be not larger than the first predetermined value set in advance. Thus, the feeling of strangeness given to the operator is still large. In addition, although Patent Document 1 has given description about a technique in which the operation of the electric motor is controlled in accordance with an operation mode of the working machine so as to suppress waste of electric power, Patent Document 1 has not given any description about a technique for keeping the assist drive of the electric motor even at an end time instant of a preset operation scheduled time in consideration of the operation scheduled time. Thus, it is impossible to prevent the amount of electricity stored in the electric storage device from reaching the lower limit value in the middle of the operation scheduled time.

The invention has been accomplished in order to solve the problems inherent in the background art. An object of the invention is to provide a hybrid type or battery type working machine in which even when the residual amount of electricity stored in an electric storage device decreases to be not larger than a predetermined value, a feeling of strangeness on an operation is hardly given to an operator, and electric power stored in the electric storage device can be used effectively within a preset operation scheduled time.

Solution to Problem

In order to solve the foregoing technical problems, the invention provides an working machine including: a hydraulic pump; an electric motor which drives the hydraulic pump; an electric storage device which supplies electric power for power running to the electric motor; and a control device which controls a pump absorption horsepower maximum value in accordance with an amount of electricity stored in the electric storage device; characterized in that: the control device obtains an amount of reduction in the amount of electricity stored in the electric storage device within a stored electricity amount change measuring time set in advance, obtains an operation possible time from the obtained amount of reduction and a residual amount of electricity stored in the electric storage device, determines whether the obtained operation possible time reaches a remaining time of a preset operation scheduled time obtained by subtracting a currently spent real operating time from the operation scheduled time or not, and reduces the pump absorption horsepower maximum value to such a value that the operation possible time can reach the remaining time of the operation scheduled time when determination is made that the operation possible time does not reach the remaining time.

The power consumption rate of a hybrid type or battery type working machine depends on the situation of a site of an operation (for example, whether it is a flat land or a slope) and the contents of the operation to be executed. The power consumption rate of the working machine is substantially constant through the operation of one day. Accordingly, when the amount of reduction in the amount of electricity stored in the electric storage device within the stored electricity amount change measuring time immediately after the start of the operation is obtained, the operation possible time in which the electric motor can be driven for power running can be obtained by dividing the residual amount of electricity stored in the electric storage device by the obtained amount of reduction. In addition, when the obtained operation possible time is compared with a remaining time of the preset operation scheduled time obtained by subtracting the currently spent real operating time from the preset operation scheduled time, determination can be made as to whether the operation possible time exceeds the remaining time of the operation scheduled time or not. In this case, when the pump absorption horsepower maximum value is reduced, the power consumption rate of the working machine is reduced so that the operation possible time can be elongated, and a new pump absorption horsepower maximum value with which the operation possible time can be made equal to the remaining time of the operation scheduled time can be obtained. In this manner, the pump absorption horsepower maximum value can be reduced substantially uniformly from the start time instant of the preset operating time to the end time instant of the operating time in accordance with the reduction in the amount of electricity stored in the electric storage device. Therefore, a feeling of strangeness on the operation is hardly given to the operator, and the drive of the electric motor can be secured until the end time instant of the operating time. Thus, high operability can be kept.

In addition, the invention provides an working machine having the aforementioned configuration, further including: an engine which serves for driving the hydraulic pump and whose rated output torque is smaller than the pump absorption horsepower maximum value; characterized in that: the control device operates the engine at the rated output torque even when determination is made that the obtained operation possible time does not reach the remaining time of the operation scheduled time.

With this configuration, the engine of the hybrid type working machine can be miniaturized, and fuel consumption, the amount of exhaust gas and noise can be reduced.

In addition, the invention provides an working machine having the aforementioned configuration, characterized in that: the control device includes a residual stored electricity amount monitoring unit which calculates a new pump absorption horsepower maximum value corresponding to the pump absorption horsepower maximum value which has been reduced from the amount of electricity stored in the electric storage device, the operation scheduled time and the real operating time, and a load torque control unit which calculates a minimum value of an tilt angle signal of the hydraulic pump from the new pump absorption horsepower maximum value outputted from the residual stored electricity amount monitoring unit, a rotational speed of the engine and a discharge pressure of the hydraulic pump.

With this configuration, a control device which can be applied to the working machine according to the invention can be built simply by additionally providing the residual stored electricity amount monitoring unit and the load torque control unit in a control device for a general working machine which has been known heretofore. Accordingly, the working machine according to the invention can be implemented at a low cost.

In addition, the invention provides an working machine having the aforementioned configuration, characterized in that: a time between an operation start scheduled time instant of one day and an operation end scheduled time instant of the day is set as the operation scheduled time, and a fixed time from an operation start time instant of the day is set as the stored electricity amount change measuring time.

In a so-called plug-in hybrid type working machine in which a charging device is charged directly on a wall socket, adoption of an operation mode in which charging is completed during nighttime and an operation is carried out during daytime from morning to evening may be considered. In this case, the time from the operation start scheduled time instant in the morning to the operation end scheduled time instant in the evening is set as the operation scheduled time. In addition, a fixed time from the start of the working machine as the first thing in the morning is set as the stored electricity amount change measuring time. Thus, assist drive using the electric motor can be performed until the operation end scheduled time instant in the evening.

In addition, the invention provides an working machine having the aforementioned configuration, characterized in that: a time between an operation start scheduled time instant of one day and an operation end scheduled time instant of the day is set as the operation scheduled time, and a fixed time from an operation start time instant of the day and a fixed time from a desirably set time instant after the pump absorption horsepower maximum value is reduced are set as the stored electricity amount change measuring time.

With this configuration, the stored electricity amount change measuring time can be not only set as a fixed time from the start of the working machine as the first thing in the morning but also set a plurality of times at any desired time instant within the operation scheduled time. Thus, the pump absorption horsepower maximum value can be corrected more minutely in accordance with the residual amount of stored electricity.

In addition, the invention provides an working machine having the aforementioned configuration, characterized in that: when the control device reduces the pump absorption horsepower maximum value, the control device reduces the pump absorption horsepower maximum value in multi-stages or continuously from an old pump absorption horsepower maximum value corresponding to the pump absorption horsepower maximum value which has not yet been reduced, to a new pump absorption horsepower maximum value corresponding to the pump absorption horsepower maximum value which has been reduced.

With this configuration, the pump absorption horsepower maximum value can be reduced gently so that the operator hardly has a feeling of strangeness on the operation. Thus, the fatigue of the operator can be relaxed.

In addition, the invention provides an working machine having the aforementioned configuration, characterized in that: when the control device reduces the pump absorption horsepower maximum value, the control device divides the pump absorption horsepower maximum value into a plurality of regions having different target flow rates, and reduces the pump absorption horsepower maximum value from an old pump absorption horsepower maximum value corresponding to the pump absorption horsepower maximum value which has not yet been reduced to a new pump absorption horsepower maximum value corresponding to the pump absorption horsepower maximum value which has been reduced, so that temporal differences among the regions can increase in a descending order of target flow rate.

In the state where hydraulic actuators operate at high speed, that is, in the state where the flow rate of pressure oil flowing in the hydraulic actuators is high, it is difficult for the operator to sense a change in the pump absorption horsepower maximum value even when the pump absorption horsepower maximum value drops down to some extent. On the contrary, in the state where the flow rate of pressure oil flowing in the hydraulic actuators is low, the operator can sensitively sense a change in the pump absorption horsepower maximum value even when the pump absorption horsepower maximum value is reduced slightly. Accordingly, when the pump absorption horsepower maximum value is reduced in these regions sequentially in a descending order of target flow rate, the pump absorption horsepower maximum value can be changed smoothly without giving any feeling of strangeness on the operation to the operator.

In addition, the invention provides an working machine having the aforementioned configuration, characterized in that: the real operating time is counted using an hour meter, and the hour meter stops counting the real operating time when each part of the machine is changed over to an operation prohibition state by a gate lock unit.

With this configuration, the time when each part of the machine is changed over to an operation prohibition state by the gate lock unit, that is, the time when operation of the working machine is suspended is not counted as the real operating time. It is therefore possible to calculate an accurate new pump absorption horsepower maximum value which is more suitable to the actual situation of the operation.

Advantageous Effects of Invention

The invention provides a hybrid type or battery type working machine, wherein: an amount of reduction in the amount of electricity stored in an electric storage device within a stored electricity amount change measuring time set in advance is obtained; an operation possible time is obtained from the obtained amount of reduction and the residual amount of electricity stored in the electric storage electricity; determination is made as to whether the obtained operation possible time reaches a remaining time of a preset operation scheduled time obtained by subtracting a currently spent real operating time from the operation scheduled time or not; and when determination is made that the operation possible time does not reach the remaining time of the operation scheduled time, a pump absorption horsepower maximum value is reduced to such a value that the operation possible time can reach the remaining time of the operation scheduled time. Accordingly, the pump absorption horsepower maximum value can be reduced substantially uniformly from a start time instant of a preset operating time to an end time instant of the operating time in accordance with the reduction in the amount of electricity stored in the electric storage device. Thus, the operation performance of the working machine can be made excellent. In addition, the drive of an electric motor can be secured until the end time instant of the operating time so that high operability can be kept.

DESCRIPTION OF EMBODIMENTS

An working machine according to the invention will be described below while a hybrid type hydraulic excavator is used as an example. The hybrid type hydraulic excavator is configured so that a hydraulic pump is driven by an engine and an electric motor driven for power running by electric power discharged from an electric storage device and hydraulic actuators are driven by pressure oil ejected from the hydraulic pump. The hybrid type hydraulic excavator is regarded as a plug-in hybrid type excavator machine which is configured so that the rated absorption horsepower of the pump is higher than the rated output of the engine and the amount of electricity stored in the electric storage device is fully consumed in a set operating time. In addition to the plug-in hybrid type hydraulic excavator, the invention may be applied to a battery type hydraulic excavator in which a hydraulic pump is driven only by an electric motor. In addition, the invention may be applied to another hybrid type or battery type working machine than the hydraulic excavator.

Example 1

Figure 1:
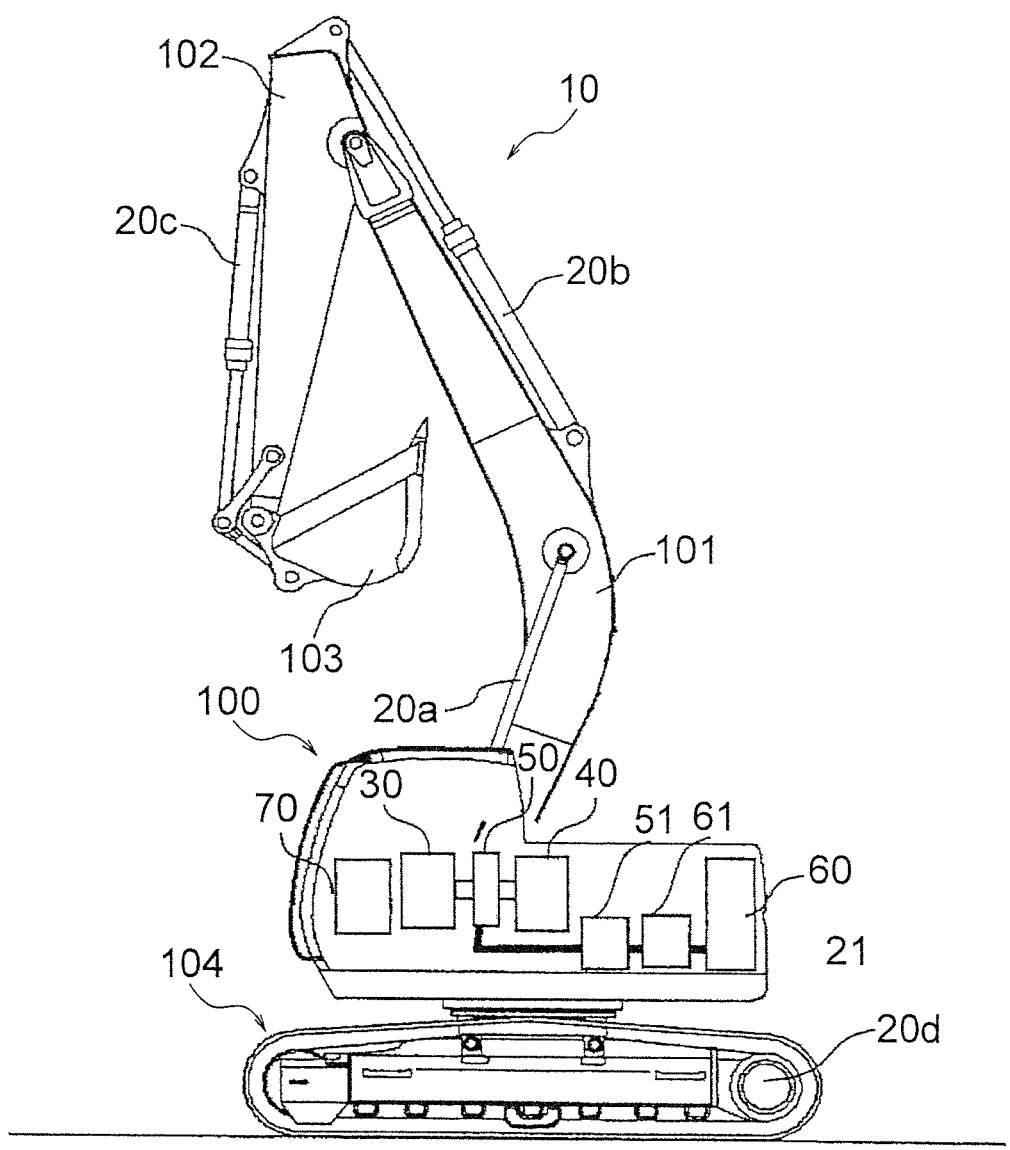
FIG. 1 A configuration diagram of a plug-in hybrid type hydraulic excavator according to an embodiment.

A plug-in hybrid type hydraulic excavator 10 shown in FIG. 1 has a boom 101, an arm 102, a bucket 103, a crawler 104 and a revolving structure 100 as operating portions. The boom 101, the arm 102 and the bucket 103 are driven by hydraulic cylinders 20a, 20b and 20c which are hydraulic actuators, respectively. On the other hand, the crawler 104 for travelling is driven by a hydraulic motor 20d which is a hydraulic actuator, and the revolving structure 100 is also driven by a not-shown hydraulic motor which is a hydraulic actuator. These hydraulic actuators 20a to 20d are driven by pressure oil ejected from a hydraulic pump 30. The hydraulic pump 30 is a variable displacement hydraulic pump. The displacement (the amount of pressure oil ejected by one revolution) of the hydraulic pump 30 can be changed when the tilt angle thereof is changed. The drive shaft of the hydraulic pump 30 is connected coaxially with an engine 40 and an electric motor 50. The hydraulic pump 30 is operated by the rotation of the engine 40 and the power running of the electric motor 50. The electric motor 50 is electrically connected to an electric storage device 60 through an inverter 51 and a chopper 61. The power running output of the electric motor 50 is performed by electric power which is discharged from the electric storage device 60, transformed by the chopper 61 and converted into an alternating current by the inverter 51. The hydraulic pump 30, the engine 40, the electric motor 50, the inverter 51, the electric storage device 60, the chopper 61 and a control device 70 for controlling these are mounted on the revolving structure 100. Incidentally, the electric motor 50 can generate electric power by the drive force of the engine 40 and charge the electric storage device 60 with the electric power. When the hydraulic motor of the revolving structure 100 is replaced by an electric motor, the electric motor for revolution may be driven by the electric power generated by the electric motor 50.

An engine whose rated output torque is smaller than the pump absorption horsepower maximum value of the hydraulic pump 30 is provided as the engine 40. The control device 70 operates the engine 40 at its rated output torque regardless of the change of the pump absorption horsepower maximum value. Thus, the engine of the hybrid type working machine can be miniaturized and fuel consumption, the amount of exhaust gas and noise can be reduced.

Figure 2:
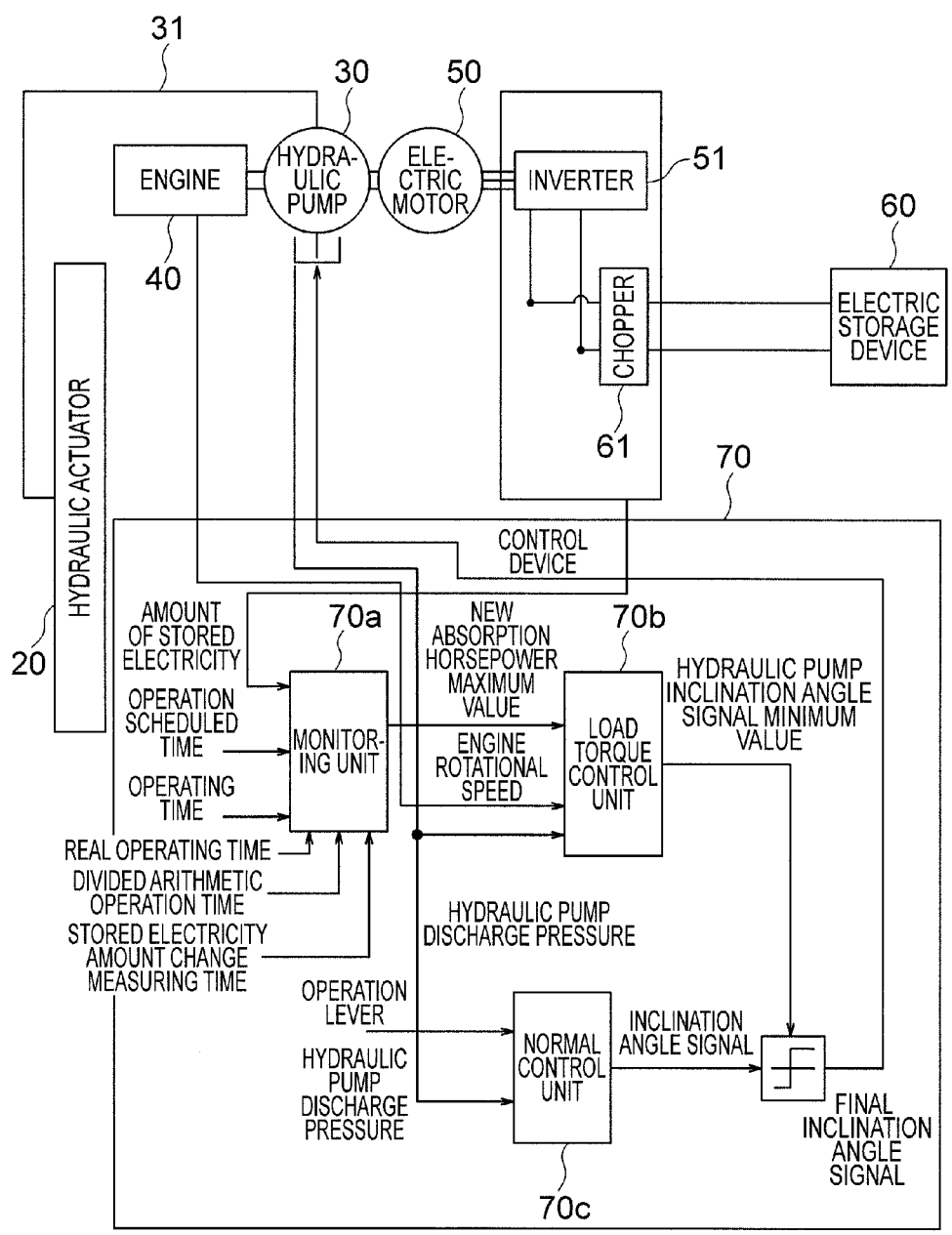
FIG. 2 A system configuration diagram of the plug-in hybrid type hydraulic excavator according to the embodiment.

As shown in FIG. 2, the control device 70 fetches a hydraulic pump discharge pressure detected from the hydraulic pump 30, an engine rotational speed detected from the engine 40, an amount of electricity stored in the electric storage device 60 and detected from an inverter circuit including the chopper 61, an operation scheduled time, a stored electricity amount change measuring time, an operating time and a divided arithmetic operation time outputted from a not-shown timer, a real operating time outputted from a not-shown hour meter, and an operation lever signal outputted from a not-shown operation lever, so that the control device 70 outputs a final tilt angle signal to the hydraulic pump 30. The control device 70 has not only a normal control unit 70c which calculates and outputs the tilt angle signal from the hydraulic pump discharge pressure and the operation lever signal, but also a monitoring unit (residual stored electricity amount monitoring unit) 70a which calculates and outputs a new pump absorption horsepower maximum value, which is a corrected pump absorption horsepower maximum value, from the amount of stored electricity, the operation scheduled time, the stored electricity amount change measuring time, the operating time and the real operating time, and a load torque control unit 70b which calculates and outputs a minimum value of the tilt angle of the hydraulic pump 30 from the new pump absorption horsepower maximum value outputted from the monitoring unit 70a. According to this configuration, the control device which can be applied to the working machine according to the invention can be built simply by additionally providing the residual stored electricity amount monitoring unit 70a and the load torque control unit 70b in a control device for a general working machine which has been heretofore known. Thus, the working machine according to the invention can be implemented at a low cost.

The normal control unit 70c outputs the tilt angle signal for controlling the absorption horsepower of the hydraulic pump 30, based on the operation lever signal outputted from the operation lever operated by an operator, and the hydraulic pump discharge pressure detected from the hydraulic pump 30. At the same time, the normal control unit 70c controls the outputs of the engine 40 and the electric motor 50 in accordance with the absorption horsepower of the hydraulic pump 30. The tilt angle signal outputted from the normal control unit 70c is limited to the tilt angle signal minimum value outputted from the monitoring unit 70a and the load torque control unit 70b. When the electric motor 50 is operated for power running under this control, the amount of electricity stored in the electric storage device 60 is reduced correspondingly to the energy consumed. In FIG. 2, the output control portion of the engine 40 and the electric motor 50 is a known item and not the gist of the invention so that illustration thereof is omitted.

The operation scheduled time shown in FIG. 2 is a time in which it is requested to drive the electric motor 50 for power running by the electric power stored in the electric storage device 60. Normally, the operation scheduled time is set as 7.5 hours or 8 hours corresponding to the operating time of one day. The stored electricity amount change measuring time is a time for measuring the amount of reduction in the amount of electricity stored in the electric storage device 60. The stored electricity amount change measuring time is set at least as a fixed time, for example, 10 minutes from a time instant when the engine 40 starts up. The operating time is a total time in which the control device 70 repeats the calculation of the new pump absorption horsepower maximum value. The operating time is set, for example, as 10 minutes. The divided arithmetic operation time corresponds to a pitch in which the control device 70 calculates the new pump absorption horsepower maximum value. The divided arithmetic operation time is set, for example, as 1 minute. Thus, in this case, the number n of times of repetition with which the control device 70 calculates the new pump absorption horsepower maximum value is 10.

The control of the pump absorption horsepower maximum value carried out by the control device 70 in accordance with the amount of electricity stored in the electric storage device 60 will be described below with reference to FIGS. 3 to 6.

Figure 4:
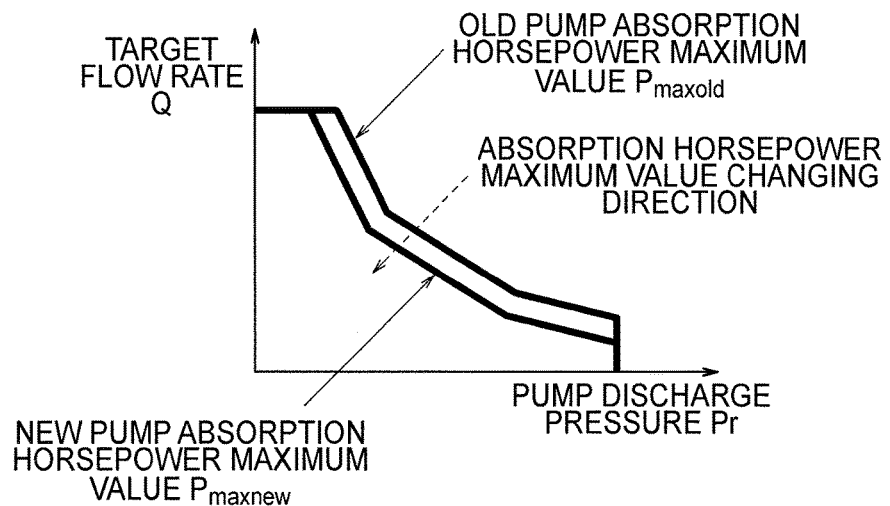
FIG. 4 A transition diagram of a pump absorption horsepower maximum value according to Example 1.
Figure 5:
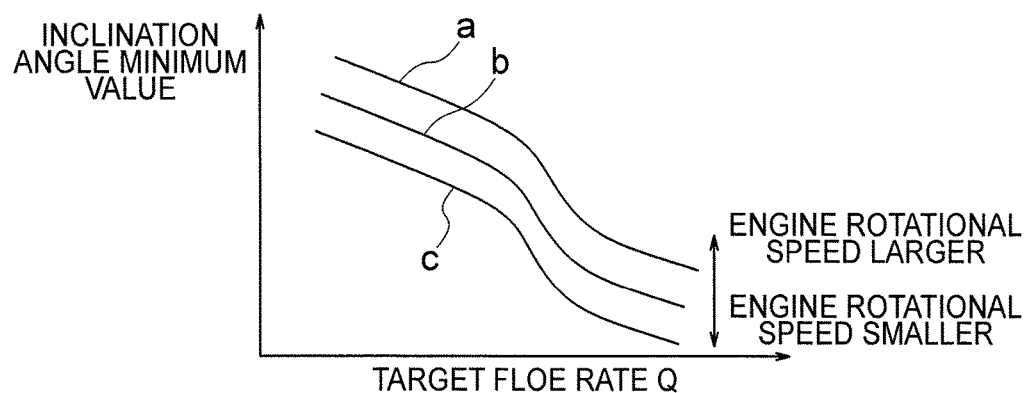
FIG. 5 A transition diagram of an tilt angle minimum value according to Example 1.

At the start of operation, an initial value (old pump absorption horsepower maximum value) $P_{maxold}$ is set as the pump absorption horsepower maximum value as shown in FIG. 4, and the tilt angle signal minimum value has a characteristic a corresponding thereto as shown in FIG. 5. That is, when the operator operates the operation lever to the utmost, the final tilt angle signal outputted from the control device 70 takes a value corresponding to $P_{maxold}$, which is larger than the rated output of the engine 40. Thus, the shortage is compensated by the power running drive of the electric motor 50.

Figure 3:
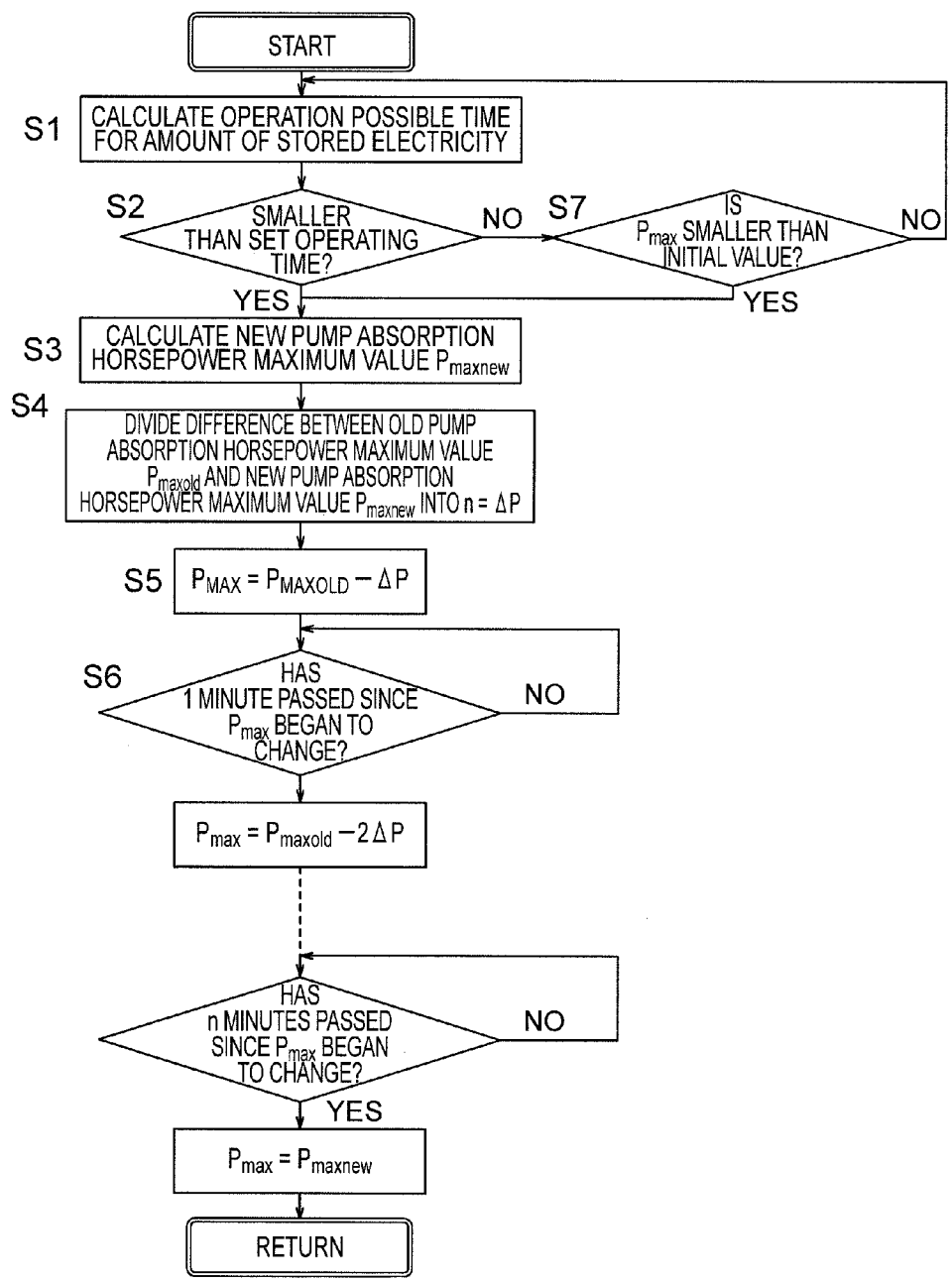
FIG. 3 A flow chart showing the procedure of control in an electric storage device monitoring unit provided in the plug-in hybrid type hydraulic excavator according to the embodiment.
Figure 6A:
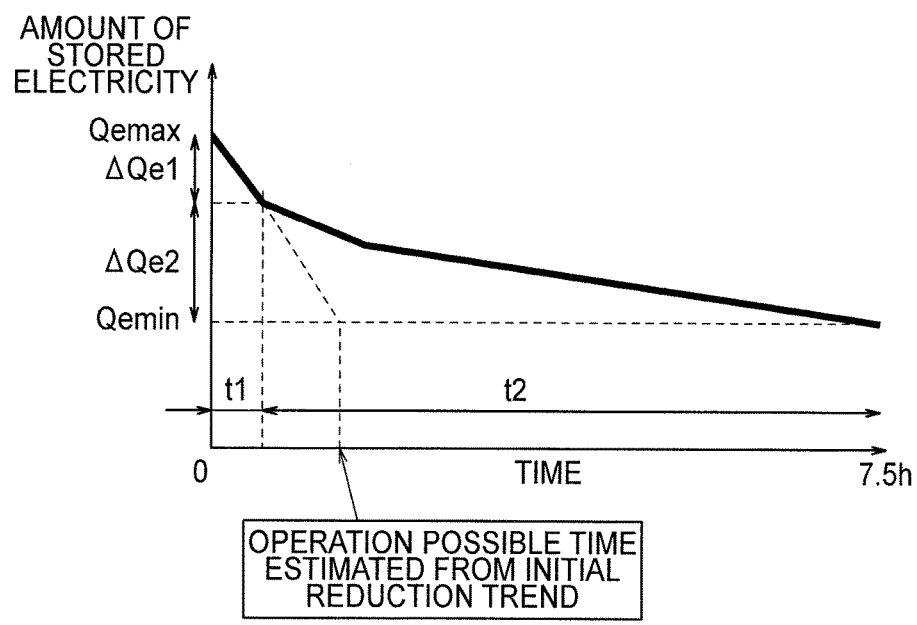
FIG. 6 Graphs showing change of an amount of stored electricity, an output of an engine and an power-running output of an electric motor in the case where a control method according to Example 1 is applied.

In Step S1 in FIG. 3, the monitoring unit 70a calculates the amount of reduction, by which the amount of stored electricity is reduced by the power running of the electric motor 50, in a stored electricity amount change measuring time t1 set in advance from the operation start time instant. Next, an operation possible time in which the operation can be continued is calculated from the calculated amount of reduction in the amount of stored electricity and the stored electricity amount change measuring time t1. In Step S2 in FIG. 3, determination is made as to whether the calculated operation possible time is shorter than a remaining time t2 of a preset operation scheduled time or not. In the example of FIG. 6(a), the operation possible time is smaller than the remaining time t2 of the operation scheduled time. When determination is made in this manner that the operation possible time is shorter than the remaining time t2 of the operation scheduled time (YES), the flow of processing is moved to Step S3 in FIG. 3, in which the new pump absorption horsepower maximum value $P_{maxnew}$ in which the electric motor 50 can be driven for power running within the range of the remaining time t2 of the operation scheduled time is calculated from the residual amount of electricity stored in the electric storage device 60, the operation scheduled time and the stored electricity amount change measuring time t1.

The new pump absorption horsepower maximum value $P_{maxnew}$ can be calculated in the following method. That is, as apparent from FIG. 6(b), the new pump absorption horsepower maximum value $P_{maxnew}$ is calculated as the sum of the rated output $P_{engmax}$ of the engine 40 and an addition PM2 derived from the electric motor 50. Therefore, it is assumed that the ratio between the average output of the electric storage device 60 in the stored electricity amount change measuring time t1 and the average output of the electric storage device 60 in the remaining time t2 of the operation scheduled time corresponds to the ratio between an addition PM1 derived from the electric motor 50 in the initial condition and the addition PM2 derived from the electric motor 50 after the lapse of the stored electricity amount change measuring time t1. That is, as shown in FIG. 6(a), when the amount of consumption of stored electricity in the stored electricity amount change measuring time t1 is designated as $\Delta Q_{e1}$ and the residual amount of stored electricity after the lapse of the stored electricity amount change measuring time t1 is designated as $\Delta Q_{e2}$, it is assumed that the ratio is established as:

$$\Delta Q_{e1}/t1 : \Delta Q_{e2}/t2 = PM1 : PM2$$

This can be solved as:

$$P_{maxnew} = PM2 + P_{engmax}$$
$$= (\Delta Q_{e1}/t1)/(\Delta Q_{e2}/t2) \times PM1 + P_{engmax}$$

Besides, there may be considered another method in which the average output of the electric storage device 60 is calculated from a real value obtained by subtracting the rated output $P_{engmax}$ of the engine 40 from the real pump absorption horsepower.

Figure 6B:
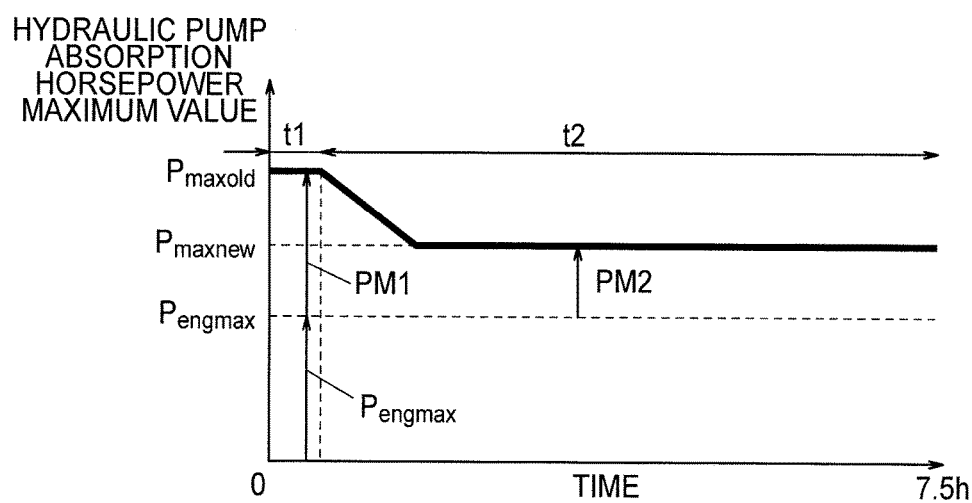

In this embodiment, the change from the old pump absorption horsepower maximum value $P_{maxold}$ to the new pump absorption horsepower maximum value $P_{maxnew}$ is carried out in a plurality of batches in each set divided arithmetic operation time till the set operating time is terminated. That is, after the new pump absorption horsepower maximum value $P_{maxnew}$ is calculated in Step S3 in FIG. 3, the flow of processing is moved to Step S4, in which an adjustment amount $\Delta P$ of the pump absorption horsepower maximum value for each time is calculated by dividing the difference between the old pump absorption horsepower maximum value $P_{maxold}$ and the new pump absorption horsepower maximum value $P_{maxnew}$ into n. Next, the flow of processing is moved to Step S5, in which the pump absorption horsepower maximum value $P_{max}$ is set as $P_{maxold} - \Delta P$, and an tilt angle signal minimum value corresponding thereto is outputted by the load torque control unit 70b. After that, in Step S6, this operation is carried out in each divided arithmetic operation time (one minute in this example) till the preset operating time is terminated. Thus, the tilt angle signal minimum value is reduced sequentially from the characteristic a to a characteristic b and from the characteristic b to a characteristic c. In accordance therewith, the pump absorption horsepower maximum value changes gently from the old pump absorption horsepower maximum value $P_{maxold}$ to the new pump absorption horsepower maximum value $P_{maxnew}$ as shown in FIG. 6(b). This change will be stepwise in accordance with the setting of the divided arithmetic operation time and the magnitude of the difference between the old pump absorption horsepower maximum value $P_{maxold}$ and the new pump absorption horsepower maximum value $P_{maxnew}$. In this manner, the pump absorption horsepower maximum value can be reduced gently so that the operator hardly has a feeling of strangeness on an operation and the fatigue of the operator can be relaxed.

When determination is made in Step S2 in FIG. 3 that the calculated operation possible time is longer than the remaining time t2 of the operation scheduled time set in advance (NO), the flow of processing is moved to Step S7 in FIG. 3, in which determination is made as to whether the pump absorption horsepower maximum value $P_{max}$ is lower than its initial value or not. When determination is made that the pump absorption horsepower maximum value $P_{max}$ is lower (YES), the flow of processing is moved to Step S3. When determination is made that the pump absorption horsepower maximum value $P_{max}$ is not lower (NO), the flow of processing returns to Step S1. In this manner, the residual amount of electricity stored in the electric storage device 60 can be used effectively.

In this example, the stored electricity amount change measuring time t1 is assigned only to a fixed time from the operation start time instant of one day. However, in addition thereto, the stored electricity amount change measuring time t1 may be set as a fixed time from any desirably set time instant after the pump absorption horsepower maximum value has been reduced. In this manner, the pump absorption horsepower maximum value can be corrected more minutely in accordance with the amount of electricity stored in the electric storage device 60. In addition, as for the count of the real operating time, the count of the real operating time may be suspended when each part of the machine is changed over to an operation prohibition state by a gate lock unit. In this manner, the time in which each part of the machine has been changed over to the operation prohibition state by the gate lock unit, that is, the time in which operation of the working machine is suspended, is not counted as the real operating time. Thus, an accurate new absorption horsepower maximum value that is more suitable for the actual situation of the operation can be calculated.

Example 2

Figure 7:
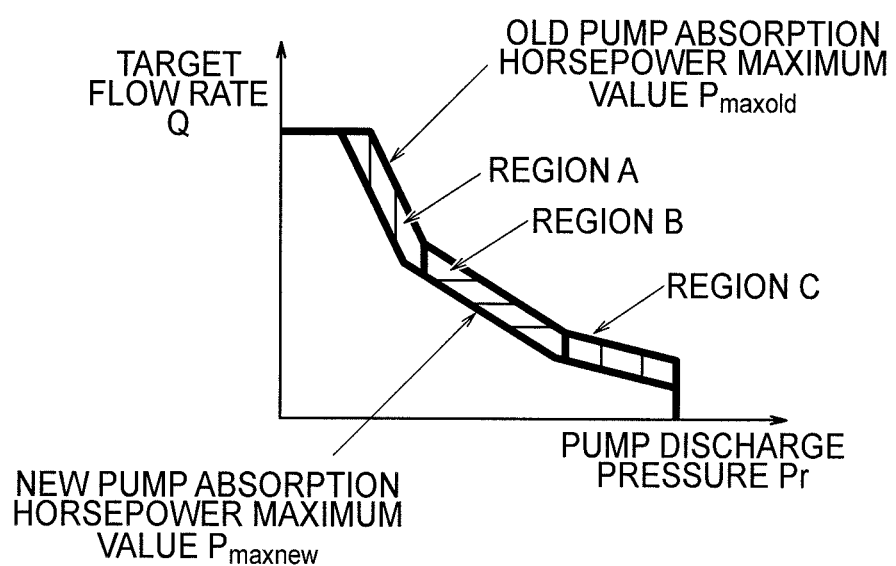
FIG. 7 A transition diagram of a pump absorption horsepower maximum value according to Example 2.

Next, Example 2 of the working machine according to the invention will be described with reference to FIG. 7. According to this example, as shown in FIG. 7, the difference between the new pump absorption horsepower maximum value and the old pump absorption horsepower maximum value is divided into a region A whose target flow rate Q is high, a region B whose target flow rate Q is medium and a region C whose target flow rate Q is low. When the pump absorption horsepower maximum value is reduced, the part corresponding to the region A of the old pump absorption horsepower maximum value is first reduced to the new pump absorption horsepower maximum value, the part corresponding to the region B of the old pump absorption horsepower maximum value is next reduced to the new pump absorption horsepower maximum value, and the part corresponding to the region C of the old pump absorption horsepower maximum value is finally reduced to the new pump absorption horsepower maximum value. In the state where the hydraulic actuators are operating at high speed, that is, in the state where the flow rate of pressure oil flowing in the hydraulic actuators is high, the operator hardly senses a change in the pump absorption horsepower maximum value when the pump absorption horsepower maximum value is reduced to some extent. On the contrary, in the state where the flow rate of pressure oil flowing in the hydraulic actuators is low, the operator can sensitively sense the change even when the pump absorption horsepower maximum value is reduced slightly. Therefore, as described above, when the pump absorption horsepower maximum value is reduced sequentially in the regions in a descending order of target flow rate, the pump absorption horsepower maximum value can be changed smoothly without giving a feeling of strangeness on an operation to the operator.

In the working machine according to the invention, the pump absorption horsepower maximum value can be reduced substantially uniformly from the start time instant of the preset operating time to the end time instant of the operating time in accordance with the reduction in the amount of electricity stored in the electric storage device. Thus, a feeling of strangeness on an operation is hardly given to the operator and the fatigue of the operator can be lightened. In addition, the drive of the electric motor can be secured until the end time instant of the operating time. Thus, high operability can be kept.

INDUSTRIAL AVAILABILITY

The invention can be applied to an working machine such as a plug-in hybrid type or battery type hydraulic excavator.

REFERENCE SIGNS LIST 10 hybrid type excavator machine
20 hydraulic actuator
20a hydraulic cylinder for driving boom
20b hydraulic cylinder for driving arm
20c hydraulic cylinder for driving bucket
20d hydraulic cylinder for driving crawler
30 hydraulic pump
40 engine
50 electric motor
60 electric storage device
70 control device
70a monitoring unit
70b load torque control unit
100 revolving structure
101 boom
102 arm
103 bucket
104 crawler
$Q_{max}$ maximum value of amount of electricity stored in electric storage device
$Q_{min}$ lower limit value of amount of electricity stored in electric storage device
t1 stored electricity amount change measuring time
t2 remaining time of operation scheduled time
$\Delta_{Qe1}$ amount of stored electricity that has been consumed in t1
$\Delta_{Qe2}$ amount of stored electricity that can be consumed in t2
$P_{engmax}$ maximum rated output of engine
PM1 output of electric motor in t1
PM2 output of electric motor in t2
$P_{maxold}$ old pump absorption horsepower maximum value
$P_{maxnew}$ new pump absorption horsepower maximum value

The invention claimed is:

1. A working machine comprising:
    a hydraulic pump;
    an electric motor which drives the hydraulic pump;
    an electric storage device which supplies electric power for power running to the electric motor; and
    a control device which controls a pump absorption horsepower maximum value in accordance with an amount of electricity stored in the electric storage device,
    wherein: the control device obtains an amount of reduction in the amount of electricity stored in the electric storage device within a stored electricity amount change measuring time set in advance, obtains an operation possible time from the obtained amount of reduction and a residual amount of electricity stored in the electric storage device, determines whether the obtained operation possible time reaches a remaining time of a preset operation scheduled time obtained by subtracting a currently spent real operating time from the operation scheduled time or not, and reduces the pump absorption horsepower maximum value to such a value that the operation possible time can reach the remaining time of the operation scheduled time when determination is made that the operation possible time does not reach the remaining time,
    wherein: when the control device reduces the pump absorption horsepower maximum value, further the control device divides a difference between an old pump absorption horsepower maximum value corresponding to the pump absorption horsepower maximum value which has not yet been reduced and a new pump absorption horsepower maximum value corresponding to the pump absorption horsepower maximum value which has been reduced into a plurality of regions having different target flow rates in a descending order of target flow rate, and reduces the old pump absorption horsepower maximum value to the new pump absorption horsepower maximum value by firstly reducing the old pump absorption horsepower maximum value corresponding to one of the regions whose target flow rate is high among the plurality of regions to the new pump absorption horsepower maximum value, and lastly reducing the old pump absorption horsepower maximum value corresponding to another one of the regions whose target flow rate is low among the plurality of regions to the new pump absorption horsepower maximum value, so that temporal differences among the regions increase in a descending order of a target flow rate.

2. The working machine according to claim 1, further comprising: an engine which serves for driving the hydraulic pump and whose rated output torque is smaller than the pump absorption horsepower maximum value; wherein the control device operates the engine at the rated output torque even when a determination is made that the obtained operation possible time does not reach the remaining time of the operation scheduled time.

3. The working machine according to claim 2, wherein: the control device includes a residual stored electricity amount monitoring unit which calculates a new pump absorption horsepower maximum value corresponding to the pump absorption horsepower maximum value which has been reduced, from the amount of electricity stored in the electric storage device, the operation scheduled time and the real operating time, and a load torque control unit which calculates a minimum value of a tilt angle signal of the hydraulic pump from the new pump absorption horsepower maximum value outputted from the residual stored electricity amount monitoring unit, a rotational speed of the engine and a discharge pressure of the hydraulic pump.

4. The working machine according to claim 1, wherein: a time between an operation start scheduled time instant of one day and an operation end scheduled time instant of the day is set as the operation scheduled time, and a fixed time from an operation start time instant of the day and a fixed time from any desirably set time instant after the pump absorption horsepower maximum value is reduced are set as new stored electricity amount change measuring times.

5. The working machine according to claim 1, wherein: the real operating time is counted using an hour meter, and the hour meter stops counting the real operating time when each part of the machine is changed over to an operation prohibition state by a gate lock unit.

* * * * *